Patented July 13, 1943

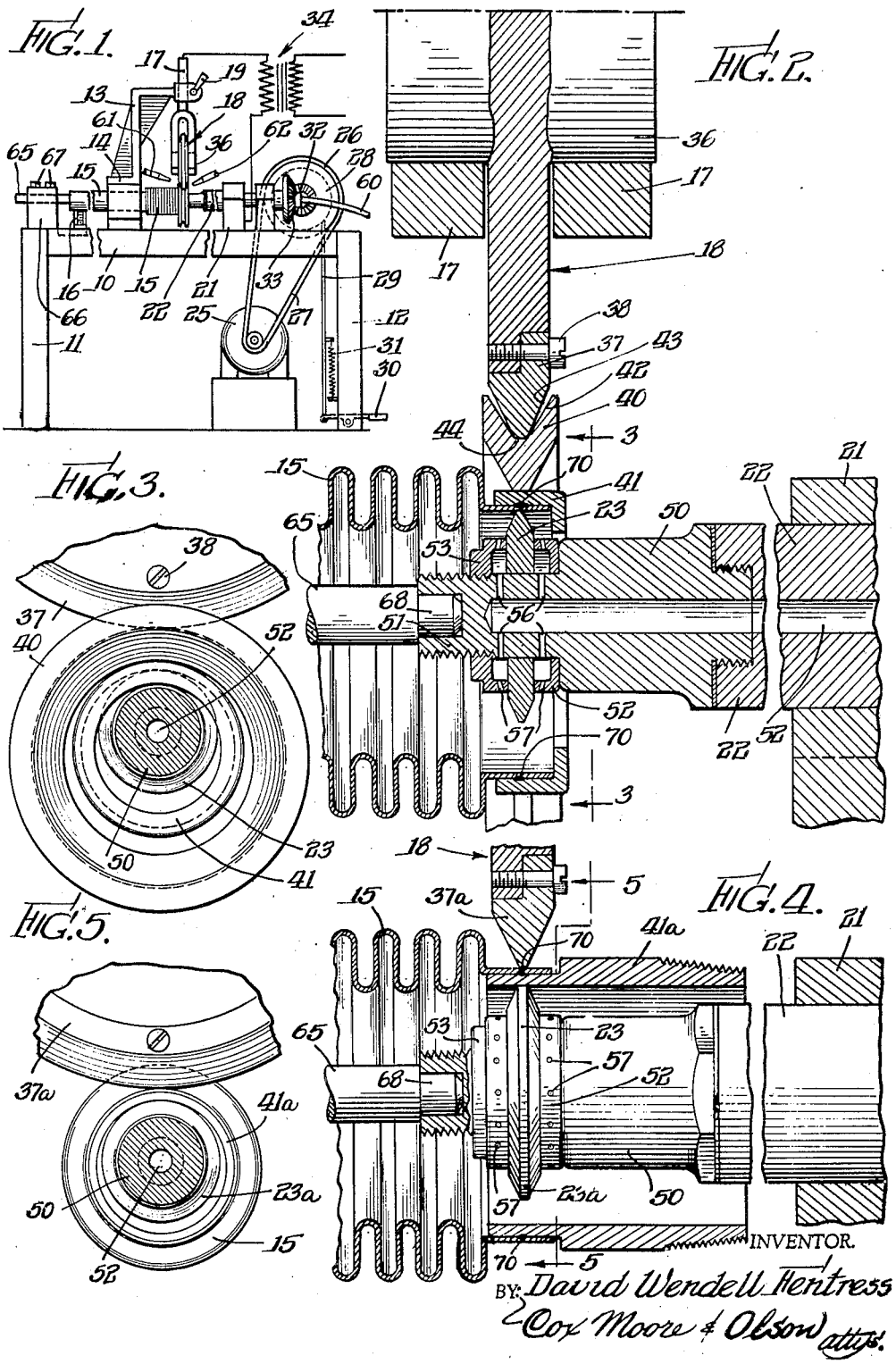

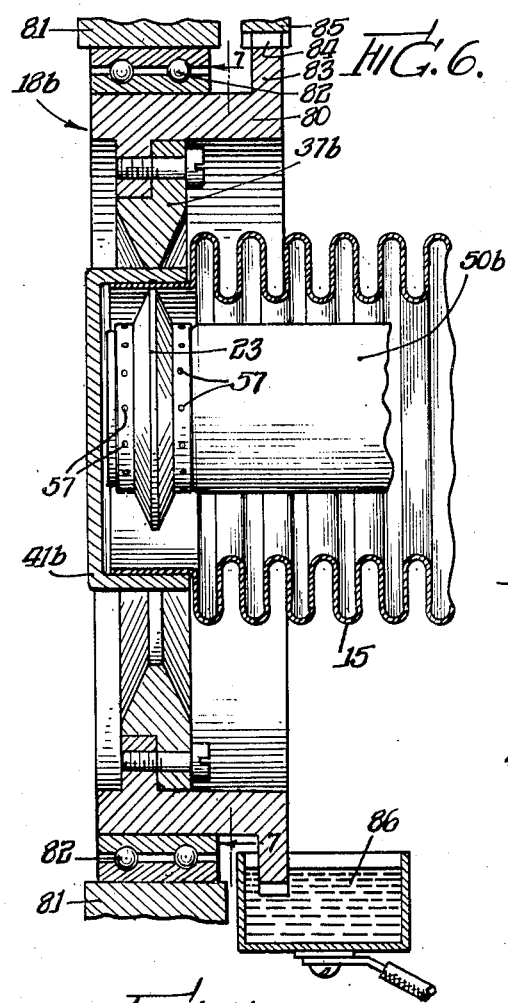
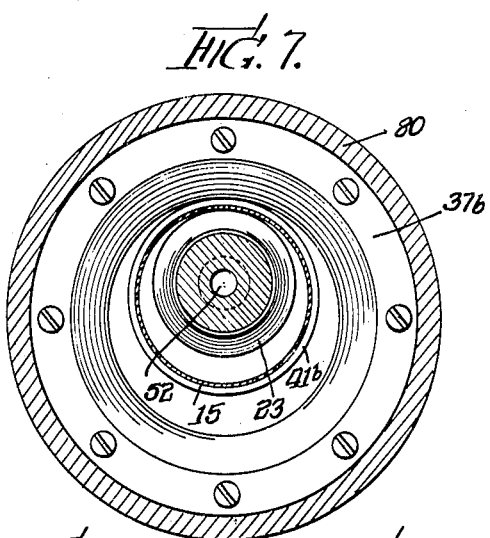
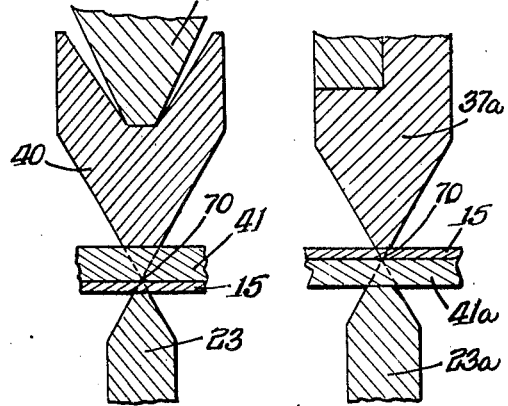
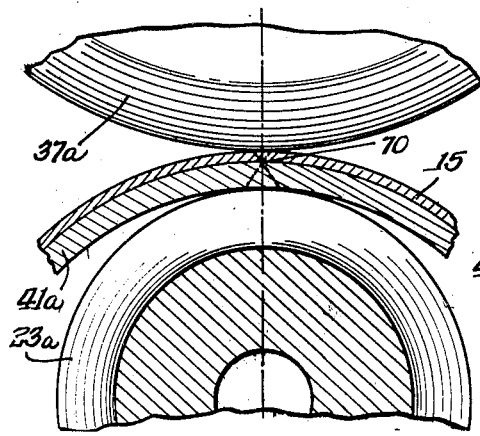
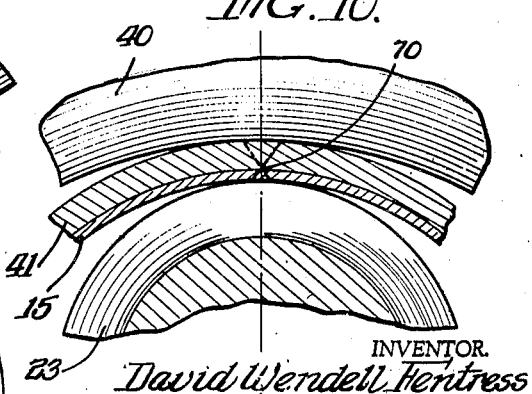

2,323,903

UNITED STATES PATENT OFFICE 2,323,903

WELDING METHOD AND APPARATUS

David Wendell Fentress, Evanston, Ill., assignor to Chicago Metal Hose Corporation, Maywood, Ill., a corporation of Illinois Application December 24, 1941, Serial No. 424,366

14 Claims. (Cl. 219—6)

This invention relates to methods and apparatus for effecting electric resistance welding, particularly upon tubing, bellows, and like circular articles.

It is an object of the invention to provide improved methods and apparatus for the welding of tubing, bellows, and like circular articles, and particularly for effecting the circular seam resistance welding thereof in the attachment of couplings, end fittings, and the like. In accordance with the invention, improved methods and apparatus are provided for economically and readily producing a continuous resistance seam weld circumferentially of a piece of tubing or ilke circular article, whereby to secure the tubing to a second tubing piece, a coupling member, or an end fitting or other suitable object with which the tubing is to be permanently united in a fluid-tight connection.

More specifically, the invention concerns and has for its object to provide improved methods and means for effecting welding operations of the type defined upon work pieces having different thicknesses at the welded joint, and to this end contemplates arrangements whereby the areas of contact between the welding electrodes and the work pieces may be properly proportioned, in accordance with the work piece characteristics, to produce more efficient welding operations, and more durable and satisfactory welded connections between the work pieces.

Further objects of the invention are to provide improved cooling arrangements for effecting the cooling of the welding electrodes and the work pieces at the welding station, which arrangements may be particularly adapted for use in the welding of tubing and the like; and, further, to provide satisfactorily operable means for effecting welding operations of the type defined upon corrugated tubing or bellows, including means for satisfactorily supporting such corrugated tubing or bellows in operative position in respect to the electrodes and at the welding station.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a general assembly view of a welding apparatus constructed in accordance with the principles of the invention and utilizing the methods thereof;

Fig. 2 is a partial detail and sectional view, on an enlarged scale, of the apparatus shown in Fig. 1, and particularly showing the electrodes and the tubing at the welding station;

Fig. 3 is a sectional view of the parts illustrated in Fig. 2, on the line 3—3 thereof;

Fig. 4 is a view similar to Fig. 2, but showing the electrodes operable upon a modified from of work piece, and with the electrode ring removed;

Fig. 5 is a sectional view of the structure of Fig. 4, on the line 5—5 thereof;

Figs. 6 and 7 illustrate a modified form of apparatus, Fig. 7 being a sectional view taken on the line 7—7 of Fig. 6; and Figs. 8, 9, 10 and 11 are detail views, somewhat diagrammatic in form, more particularly illustrating the principles of the invention.

This application is a continuation-in-part of my copending application, Serial No. 291,139, filed August 21, 1939, and entitled Welding method and apparatus.

Referring more particularly to the drawings, and first to Figs. 1, 2 and 3 thereof, it will be seen that the welding apparatus or machine illustrated comprises a main bed frame 10 mounted upon legs 11 and 12. The frame 10 carries a support bracket 13 provided with an opening 14 through which the tubing or the like 15, to be welded, may extend if the tubing or work piece is of extended length. The frame 10 also carries a platform 16, adjustable on the frame and also as to height, upon which the end of the tubing may be supported rotatably.

The support bracket 13 carries a fork member 17, in the lower forked end of which the roller electrode 18, engageable with the exterior periphery of the work pieces, is rotatably mounted. The fork member 17 is reciprocable vertically by means of an operating lever 19 and suitable opertaing mechanism, such as a rack and pinion or the like, not shown. As the lever 19 is operated, the roller electrode 18 may be brought into engagement with and removed from engagement with the work pieces. The member 17 may be suitably electrically insulated from its support and the operating lever.

The bed frame 10 also carries a bearing block 21 in which a shaft 22 is rotatably mounted. As best shown in Fig. 2, this shaft is adapted to support the electrode roller 23 engageable with the inner circumference of the work pieces, the detailed construction of which will be later described.

Means is provided for rotatably driving the shaft 22. This means comprises an electric motor or other suitable power source 25 connected to a pulley wheel 26 by means of a driving belt 27. The pulley wheel forms the driving member for a clutch mechanism 28 adapted to be controlled by a link 29 operable from a foot pedal or the like 30. A tension spring 31 normally urges the clutch into inoperative or disengaged position. Any suitable form of conventional clutch mechanism may be used. The clutch when engaged is adapted to drive a bevel gear 32 which is in geared engagement with a bevel gear 33 secured to the end of the shaft 22.

One branch of the secondary of the welding transformer, generally indicated by the reference numeral 34, is electrically connected to the electrode roller 18 through the intermediary of the forked support member 17, whereas the other branch of the transformer secondary is connected to the shaft 22 by means of the bearing block 21. The primary of the welding transformer may be connected to any suitable electrical source of supply in the conventional manner. If desired, the bearing block 21 and the shaft 22 may also be suitably insulated from the main frame elements of the machine.

Referring more specifically to the detailed structure, Fig. 2, of the outer or upper electrode 18, it will be seen that the electrode roller or wheel is provided with an axle 36 rotatably journaled within the lower end of the forked member 17. Preferably, this axle is of large diameter so as to provide a maximum area of contact with the member 17, to facilitate the transmission of the welding current. The roller electrode 18 is also provided with an outer rim portion 37 held in position by means of bolts or the like 38, so that different rims 37 may be substituted whereby to provide electrode structures of different external diameter or width, or to permit replacements to compensate for wear or deterioration, as may be required.

An electrode ring member 40 is interposed between the rim piece 37 and the work pieces to be welded, in this instance being illustrated as a piece of flexible tubing 15 and an end fitting or coupling member 41. As best shown in Fig. 3, this electrode ring generally embraces the work pieces, and is held in position during the welding operation by the downward pressure against the work exerted by the upper electrode structure. As shown in Fig. 2, the electrode ring 40 is of general V-shape in cross-section. The upper tapered walls 42 of the ring are of somewhat greater angularity than the corresponding tapered walls 43 of the electrode rim member 37, whereby to produce non-sliding contact between the parts, as indicated at 44. The electrode ring 40 is composed of suitable electrode material, such as copper or copper alloy, similar to the material of the electrodes proper. The purpose of the electrode ring will be later described.

The mounting for the lower or inner roller electrode 23 comprises an electrode body member 50 screw threaded into the end of the shaft 22, and in turn provided on its end with a screw threaded projection 51. A flange piece 52 is mounted on the projection 51, and forms one of two cooperating members for gripping the electrode 23 and holding it in position upon the body member 50. A second flange piece 53 is screw threaded onto the projection 51, the arrangement being such that when the flange piece 53 is threaded into seating position, to the right, as seen in Fig. 2, the cooperating flange pieces 53 and 52 will firmly hold the electrode roller 23 upon the electrode body member.

To effect the proper cooling of the electrodes and the work pieces at the welding station, the shaft 22 and the body member 50 are provided with a fluid duct 55 communicating at its end with a series of smaller ducts 56 projecting radially outwardly through the body member 50. The flange pieces 52 and 53 are provided with communicating ducts 57, the arrangement being such that when fluid is supplied to the central duct 55, such fluid will be sprayed outwardly through the ducts or nozzles 57 on both sides of the inner electrode and against the interior surfaces of the work pieces. Cooling fluid is supplied to the duct 55 by means of a supply conduit 60, Fig. 1, suitably connected to the duct 55 in a fluid-tight connection, but arranged to permit rotation of shaft 22. To effect the cooling of the outer or upper electrode and the outer surfaces of the work pieces at the welding station, additional and exteriorly disposed cooling liquid spray nozzles may be provided, as indicated at 61 and 62 in Fig. 1.

It will be noted that the shaft 22 preferably extends a considerable distance beyond the end of the bearing support 21 to accommodate elongated work pieces, such as fittings or tubings, to be welded, and accordingly in certain instances it may be desirable to provide additional support for the lower electrode, to withstand the pressure engagement against the work pieces. Such means, in the embodiment illustrated, comprises a support shaft 65 clampingly supported by a support block 66, Fig. 1, carried by the main bed frame 10. Bolts 67 permit the longitudinal adjustment of the support shaft 65 to project it to the right into operative position, as shown in Fig. 2, or to be withdrawn to the left, when not in use. The end of the shaft 65 is provided with a reduced portion 68 rotatably engageable within a suitable opening in the end of the projection 51 of the electrode body member.

In the operation of the apparatus, the lever 19 is manipulated to bring the upper roller electrode into pressure engagement toward the work pieces, as shown in Fig. 2, and the foot pedal 30 then operated, causing the engagement of the clutch 28 to drive the shaft 22. Preferably, suitable interlocked devices are also provided so that the current from the welding transformer is simultaneously applied to the electrodes upon the operation of the clutch. As the shaft 22 rotates, the roller electrodes, the work pieces, and the electrode ring 40 are all caused to rotate due to the frictional engagement between the parts. The welding current passes through the work between the electrodes, and as the rotation progresses a circular seam resistance weld is produced, as indicated at 70, providing a fluid-tight connection between the work pieces.

A particular feature of the invention is the provision of means and methods whereby the apparatus is enabled to effect the welding of tubing and bellows structures of paper-thin wall characteristics, frequently to end fittings or couplings which are of materially greater body thickness. Also, such bellows or tubings are frequently of small diameter and, in the case of tubings, also of considerable length, increasing the difficulties encountered with normal welding means and methods. A particular type of bellows or tubing, contemplated to be welded in accordance with the present means and methods, is stainless steel tubing or bellows having a wall thickness on the order of .003 inch to .008 inch, or the like. Such a work piece is indicated at 15 in Figs. 1 and 2. In instances where the tubing or bellows is of laminated or multiple ply wall structure, the individual plate thicknesses may be even smaller.

In the welding of tubing or bellows of this type among the problems presented are those of cooling, to prevent annealing of the tubing wall portions in the vicinity of the weld, as more particularly discussed in my copending application filed of even date herewith, Serial No. 424,365, and entitled Bellows or tubing structure. To this end it will be noted that the present apparatus includes provisions for cooling the work pieces both externally and internally, and also on both sides of each welding electrode. The internal tube portions in the vicinity of the weld are thus maintained efficiently cooled to prevent annealing and other deterioration of the paper-thin tubing wall structures, as more particularly discussed in said companion application.

An additional problem relates to the matter of properly supporting the work pieces, and particularly the thin-walled, corrugated tubing, particularly when such tubing is of extended length. In this connection, it will be noted that in the present apparatus both the tubing and the internal or lower electrode are at all times properly supported and reinforced but without interference with the convolutions or corrugations of the tubing, even though the tubing is deeply corrugated to provide a bellows type structure capable of axial compression and bellows operation.

In reference to the problem of welding the extremely thin-walled tubing to end fittings or couplings of considerably greater body thickness, it will be noted, by reference to Fig. 2, that the widths of the electrode ring 40 and the lower electrode roller 23, at their points of contact with the work pieces, are approximately in the same ratio as the thickness of the fitting 41 to the end flange of the tubing 15 to which it is to be welded. The arrangement is more specifically indicated in the illustrative view, Fig. 8, on an enlarged scale. This arrangement insures a proper path of travel for the current between the work pieces of materially contrasting thickness, and the production of a maximum current intensity, resulting in a proper weld at the point 70, without damage to the work piece of lesser thickness.

While the contact area between the electrodes and the work pieces may thus be controlled within certain limits by properly proportioning the electrode widths at the points of work engagement, in many instances the shape of the work pieces or like considerations limit the degree to which control may be effected by this means. Accordingly, the invention further contemplates means and methods whereby the arc of contact between the electrodes and the work pieces may also be properly proportioned, in accordance with the work piece relative thicknesses. It will be noted that the curvature of the inner electrode 23 corresponds to the curvature of the tubing, thus tending to increase the arc of contact between the tubing and the inner electrode. On the other hand, the curvature of the upper electrode is opposite from that of the work pieces, tending to decrease the arc of contact therebetween. In accordance with the invention, it will be noted that the diameter of the upper electrode is substantially greater than that of the lower electrode, the ratio being substantially four to one, as illustrated in Fig. 2, and by this means the curvature effects of the upper electrode are minimized, as the curvature thereof approaches a straight line at the point of contact. In certain instances, and with certain work pieces, this proportioning of the electrodes may satisfy the necessary requirements, but the invention contemplates means and methods whereby the arc of contact between the upper electrode structure and the work pieces may be further increased. To this end the electrode ring 40 is provided, which has the same arc of curvature as the work pieces, thus materially increasing the arc of contact between the parts, as is best shown in Fig. 10. By the selection of an electrode ring of proper size in respect to the fitting 41, it will be seen that a greatly extended arc of contact may be obtained. During the welding operation the electrode ring is maintained in proper pressure engagement with the work by the upper electrode. By the means disclosed the points of contact between the work pieces and the electrodes may be maintained in at least as great a ratio as the work piece relative thicknesses, in respect to the width of the electrodes at the point of contact, the arc of contact, and the over-all areas of contact; whereby to produce a proper welded structure.

In Figs. 4 and 5 the welding of a modified form of work structure is illustrated. In this instance the cylindrical end flange of the tubing or bellows 15 overlies the flange of the work piece 41a to which it is to be welded. The flange of the fitting 41a is again the materially thicker work piece and, accordingly, in this instance the greater area of contact is desirable between the lower electrode and the work pieces. Thus, referring to Figs. 4 and 9, it will be seen that the widths of the upper electrode rim 37a and the lower electrode roller 23a, at their points of contact with the work pieces, are again in the same ratio as the work piece thicknesses, but in correspondingly reversed order. In this connection it will be noted that the upper electrode rim, such as indicated at 37a, and the lower electrode roller, such as indicated at 23a, are both readily replaceable so that the proper parts may be substituted having the proper contact widths. Also, the ready replaceability of the lower electrode roller permits the substitution of the same in accordance with different tubing and fitting sizes to be welded. Also referring to Figs. 4 and 11, it will be noted that in this instance the electrode ring, such as shown at 40, in Fig. 2, is not used, whereby to properly proportion the arc of contact between the electrodes and the work pieces. The substitution of the electrode rim member 37a and the roller electrode 23a not only permits the selection of a proper width of contact against the work pieces, but these parts may also be selected as to diameter to properly proportion the arc of contact and the over-all areas of contact between the parts.

In the foregoing discussion it has been assumed that the electrical conductivity of the two work pieces is substantially the same, and it is to be understood that in instances where this is not true suitable modification of the factors heretofore discussed must be made. In general, the work piece of higher electrical conductivity requires less electrode contact surface.

In Figs. 6 and 7 a modified form of structure is illustrated. In this instance the body member 50b of the lower or inner electrode structure is of slightly different shape, and instead of using an electrode ring, the upper electrode, as indicated at 18b, is of general annular shape to produce the same result. More specifically, the outer electrode member comprises an annular body 80 rotatable within a stationary frame 81 by means of ball-bearings, as indicated at 82. The body 80 is provided with gear teeth on a peripheral flange portion 83, as indicated at 84, whereby the body may be driven by a gear 85, in the event that it is desired to drive the outer electrode structure. The flange 83 at its lowermost portion may dip into a mercury bath 86, whereby the welding current is supplied to the electrode structure. A replaceable rim 37b forms a part of the outer electrode structure and may directly engage the work pieces. As illustrated, the work piece or tubing 15 is in this instance reversely positioned in the machine, to be welded to a closed end cap fitting 41b.

It is obvious that various changes may be made in the specific embodiments of the invention set forth for purposes of illustration, without departing from the spirit of the invention. The invention is accordingly not to be limited to the specific embodiments illustrated, but only as indicated in the following claims.

The invention is hereby claimed as follows:

1. An apparatus for welding tubing and like circular work pieces, comprising an inner rotatable electrode adapted to be arranged within the tubing to be welded, an outer rotatable electrode member adapted to be arranged externally of the tubing, said outer electrode member being annular in form and adapted to be arranged in embracing relation to the tubing, means for bringing the electrodes into operative contact with the work, means for rotating the electrodes, and means for passing electric current between the electrodes during the rotation thereof whereby to effect the welding operation.

2. An apparatus for welding tubing and like circular work pieces, comprising an inner rotatable electrode adapted to be arranged within the tubing to be welded, an outer rotatable electrode member adapted to be arranged externally of the tubing, said outer electrode member being annular in form and adapted to be arranged in embracing relation to the tubing bearings supporting said outer electrode member for rotation about a fixed axis of rotation, means for bringing the electrodes into operative contact with the work, means for rotating the electrodes, and means for passing electric current between the electrodes during the rotation thereof whereby to effect the welding operation.

3. An apparatus for welding tubing and like circular work pieces, comprising an inner rotatable electrode adapted to be arranged within the tubing to be welded, an outer rotatable electrode member adapted to be arranged externally of the tubing, said outer electrode member being annular in form and adapted to be arranged in embracing relation to the tubing, means for bringing the electrodes into operative contact with the work, means for rotating the electrodes, and means for passing electric current between the electrodes during the rotation thereof whereby to effect the welding operation, said lastnamed means including a bath of electrically conductive liquid into which a portion of the outer electrode member is continuously immersed during electrode rotation.

4. An apparatus for welding tubing and like circular work pieces, comprising an inner rotatable electrode adapted to be arranged within the tubing to be welded, an outer rotatable electrode member adapted to be arranged externally of the tubing, an electrode ring member adapted to be arranged in embracing relation to the tubing and held in engagement with the tubing by the outer electrode member, means for rotating the outer and inner electrode members and said electrode ring, and means for passing electric current between the electrodes during the rotation thereof whereby to effect the welding operation.

5. An apparatus for welding tubing and like circular work pieces, comprising an inner rotatable electrode adapted to be arranged within the tubing to be welded, an outer rotatable electrode member adapted to be arranged externally of the tubing, an electrode ring member adapted to be arranged in embracing relation to the tubing and held in engagement with the tubing by the outer electrode member, means for rotating the outer and inner electrode members and said electrode ring, means for passing electric current between the electrodes during the rotation thereof whereby to effect the welding operation, and means for maintaining non-sliding contact between the outer electrode member and said electrode ring.

6. An apparatus for welding circular work pieces of different thicknesses, comprising an inner rotatable electrode adapted to be arranged within the work pieces to be welded, an outer rotatable electrode member adapted to be arranged externally of the work pieces, the electrode engaging the work piece of greater thickness having a width at the point of contact with said work piece at least as great in respect to the contact width between the other electrode and work piece as the thickness ratio between the work pieces, means for bringing the electrodes into operative contact with the work, means for rotating the electrodes, and means for passing electric current between the electrodes during the rotation thereof whereby to effect the welding operation.

7. An apparatus for welding circular work pieces of different thicknesses, comprising an inner rotatable electrode adapted to be arranged within the work pieces to be welded, an outer rotatable electrode member adapted to be arranged externally of the work pieces, the electrode engaging the work piece of greater thickness having an arc of contact with said work piece at least as great in respect to the arc of contact between the other electrode and work piece as the thickness ratio between the work pieces, means for bringing the electrodes into operative contact with the work, means for rotating the electrodes, and means for passing electric current between the electrodes during the rotation thereof whereby to effect the welding operation.

8. An apparatus for welding circular work pieces of different thicknesses, comprising an inner rotatable electrode adapted to be arranged within the work pieces to be welded, an outer rotatable electrode member adapted to be arranged externally of the work pieces, the electrode engaging the work piece of greater thickness having an area of contact with said work piece at least as great in respect to the area of contact between the outer electrode and work piece as the thickness ratio between the work pieces, means for bringing the electrodes into operative contact with the work, means for rotating the electrodes, and means for passing electric current between the electrodes during the rotation thereof whereby to effect the welding operation.

9. The method of welding circular work pieces of different thicknesses, comprising arranging an inner electrode within the work pieces to be welded, arranging an outer electrode member externally of the work pieces, proportioning the area of contact between the thicker work piece and its engaging electrode at least as great in respect to the contact area between the other electrode and the work piece as the thickness ratio between the work pieces, shifting the electrodes and work pieces relative to each other to cause the electrodes to move relatively circumferentially of the work pieces, and passing electric current between the electrodes and work pieces during the shifting thereof whereby to effect the welding operation.

10. An apparatus for welding tubing and like circular work pieces, comprising an inner rotatable electrode adapted to be arranged within the tubing to be welded, said inner electrode comprising a body portion, a wheel portion, and a pair of cooperating flange pieces adapted to grip opposite faces of said wheel portion and hold said wheel portion in position, said flange pieces having projecting annular sections in gripping contact with the wheel portion and recessed annular sections in spaced relation to the wheel portion, an outer rotatable electrode member adapted to be arranged externally of the tubing, means for bringing the electrodes into operative contact with the work, means for rotating the electrodes, and means for passing electric current between the electrodes during the rotation thereof whereby to effect the welding operation.

11. An apparatus as defined in claim 10, wherein said flange pieces are cup-shaped and provided with said recessed annular sections and with openings communicating with a source of cooling liquid supply, whereby cooling liquid may be ejected through said openings into engagement with the work on opposite sides of said inner electrode wheel portion.

12. An apparatus for welding tubing and like circular work pieces, comprising an inner rotatable electrode adapted to be arranged within the tubing to be welded, an outer rotatable electrode member adapted to be arranged externally of the tubing, means for bringing the electrodes into operative contact with the work, means for rotating the electrodes, means for passing electric current between the electrodes during the rotation thereof whereby to effect the welding operation, and means comprising conduits extending axially and then radially of the inner electrode for spraying cooling liquid against the internal surfaces of the work on opposite sides of the inner electrode.

13. An apparatus for welding tubing and like circular work pieces, comprising an inner rotatable electrode adapted to be arranged within the tubing to be welded, an outer rotatable electrode member adapted to be arranged externally of the tubing, means for bringing the electrodes into operative contact with the work, means for rotating the electrodes, means for passing electric current between the electrodes during the rotation thereof whereby to effect the welding operation, and means comprising an adjustable support shaft arranged coaxially with the inner electrode adapted to extend through the work pieces and to removably engage the inner electrode to support the same during its rotation.

14. An apparatus for welding tubing of the annular corrugated type, comprising an inner rotatable electrode structure adapted to be arranged within the tubing, said inner electrode structure comprising a wheel portion adapted to be engaged with the work, and a support portion adapted to extend through the tubing with maintained clearance between said support portion and the tubing convolutions, said wheel portion being removably associated with said support portion, an outer rotatable electrode member adapted to be arranged externally of the tubing, means for bringing the electrodes into operative contact with the work, means for rotating the electrodes, and means for passing electric current between the electrodes during the rotation thereof whereby to effect the welding operation.

DAVID WENDELL FENTRESS.

CERTIFICATE OF CORRECTION.

Patent No. 2,323,903.                                              July 13, 1943.

DAVID WENDELL FENTRESS.

It is hereby certified that error appears in the printed specification of the above numbered patent requiring correction as follows: Page 1, second column, line 10, for "from" read --form--; page 4, second column, line 70, claim 8, for "outer" read --other--; and that the said Letters Patent should be read with this correction therein that the same may conform to the record of the case in the Patent Office.

Signed and sealed this 7th day of December, A. D. 1943.

(Seal)
Henry Van Arsdale,
Acting Commissioner of Patents.